(No Model.)

H. BORSCH.
NOSE PIECE FOR EYEGLASSES.

No. 582,169. Patented May 11, 1897.

Witnesses
John Imire
Thos. E. Robertson

Inventor
Henry Borsch
By T. J. W. Robertson
Attorney

UNITED STATES PATENT OFFICE.

HENRY BORSCH, OF CHICAGO, ILLINOIS.

NOSE-PIECE FOR EYEGLASSES.

SPECIFICATION forming part of Letters Patent No. 582,169, dated May 11, 1897.

Application filed September 4, 1896. Serial No. 604,876. (No model.)

*To all whom it may concern:*

Be it known that I, HENRY BORSCH, a citizen of the United States, residing at Chicago, in the county of Cook and State of Illinois, have invented a certain new and useful Improvement in Nose-Pieces for Eyeglasses, of which the following is a specification, reference being had to the accompanying drawings.

This invention is an improvement on the nose-piece shown in my Patent No. 564,501, dated July 21, 1896; and it consists in the peculiar construction and arrangement hereinafter more particularly described, and then definitely claimed at the end hereof.

Figure 1:
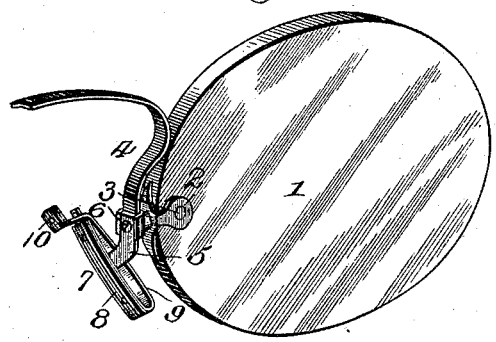
Figure 2:
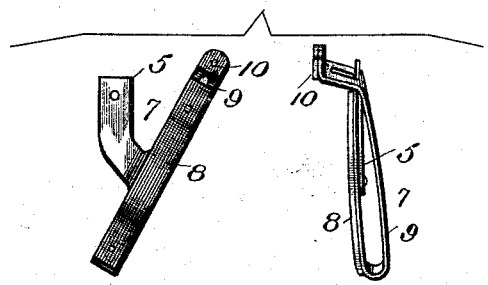
Figure 3:
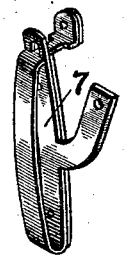
Figure 4:
Figure 5:

In the accompanying drawings, Figure 1 is a perspective view of part of a pair of eyeglasses with my nose-piece attached. Fig. 2 represents side and rear views of the nose-piece detached, on a much larger scale. Fig. 3 is a perspective view of a modification. Fig. 4 is a rear view of another modification. Fig. 5 is a side view of the same.

Referring now to the details of the drawings by figures, 1 represents the lens, having an ordinary clasp 2, which may be secured to the glass in any suitable manner, but preferably by the screw 3. In the outer end of this clasp is secured the bridge-spring 4 and the arm 5 by a screw 6. This arm 5 carries the nose-piece, comprising the main part 7, having a pad 8, and is made of spring metal bent upon itself, as shown, so as to form a long spring 9, on the end of which is a supplemental pad 10. The spring is bent near the upper end to overlap the lower or main pad and is slotted to receive a pin formed on the top of the main part 7, which thus acts as a guide to the supplemental pad 10 and prevents its bending on one side.

In some cases I slot the top of the main part 7 and narrow the upper part of the spring to allow it to slip into the slot in the top of said main part, as shown in Fig. 3, but I prefer the form shown in Fig. 2.

Instead of making the arm 5 separately from the spring it may be made in one piece with it, as shown in Fig. 3.

In the modification shown in Figs. 4 and 5 the spring 9, instead of being carried all the way up behind the main part 7, is bent out to one side, so as to approach nearer the eye than said main part. For some forms of noses this may be preferable, but in general I prefer the style shown in Figs. 1, 2, and 3.

I deem it important that the spring 9 should extend from the extreme lower end of the main part 7 and that it be so constructed as to act independently of the said main part from the lower part of the latter.

By the constructions above described very convenient and effective nose-pieces are produced, which have the advantages of those described in my aforesaid patent and yet can be made much cheaper.

What I claim as new is—

1. A nose-piece having a main part 7 provided with a supplemental part carried by a spring starting from the lower end of said main part and bent upwardly in the rear of the same, the said spring being free from the side of said main part 7 and acting independently of the latter; substantially as described.

2. A nose-piece having a main part as 7 provided with a supplemental spring part formed in one piece with said main part and starting from the lower end of the latter and bent upwardly over the top of the same, one of said parts being formed with a slot to act as a guide for the other, and the said spring part being free from the side of and acting independently of the said main part, substantially as described.

In testimony whereof I affix my signature, in the presence of two witnesses, this 1st day of September, 1896.

HENRY BORSCH.

Witnesses:
CHARLES WEYHMAN,
PHILIP A. HOERET.